United States Patent
Yae

(10) Patent No.: US 12,482,463 B2
(45) Date of Patent: Nov. 25, 2025

(54) VEHICLE AND CONTROL METHOD THEREOF

(71) Applicants: HYUNDAI MOTOR COMPANY, Seoul (KR); KIA CORPORATION, Seoul (KR)

(72) Inventor: Seong Soo Yae, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 316 days.

(21) Appl. No.: 18/074,583

(22) Filed: Dec. 5, 2022

(65) Prior Publication Data
US 2023/0252987 A1 Aug. 10, 2023

(30) Foreign Application Priority Data
Feb. 9, 2022 (KR) .................. 10-2022-0017057

(51) Int. Cl.
*G10L 15/22* (2006.01)
*G10L 15/30* (2013.01)

(52) U.S. Cl.
CPC .............. *G10L 15/22* (2013.01); *G10L 15/30* (2013.01); *G10L 2015/223* (2013.01)

(58) Field of Classification Search
CPC .... G10L 15/22; G10L 15/30; G10L 2015/223
See application file for complete search history.

(56) References Cited

U.S. PATENT DOCUMENTS

| 7,487,084 | B2 | 2/2009 | Aaron et al. |
| 11,430,436 | B2 | 8/2022 | Kim |
| 2014/0270243 | A1* | 9/2014 | Bennett .................. A61B 5/742 381/86 |
| 2017/0196032 | A1* | 7/2017 | Makke .................... H04L 67/12 |
| 2019/0359127 | A1* | 11/2019 | Alfano ...................... G08B 3/10 |
| 2020/0068310 | A1* | 2/2020 | Sullivan, Jr. ......... B60R 11/0247 |
| 2021/0082434 | A1 | 3/2021 | Yamasaki et al. |
| 2021/0166683 | A1 | 6/2021 | Joh |
| 2021/0358492 | A1 | 11/2021 | Kim |

(Continued)

FOREIGN PATENT DOCUMENTS

| AU | 2015101078 A4 * | 9/2015 |
| JP | 2006340285 A * | 12/2006 |

(Continued)

*Primary Examiner* — Bhavesh M Mehta
*Assistant Examiner* — Eunice Lee
(74) *Attorney, Agent, or Firm* — Lempia Summerfield Katz LLC

(57) ABSTRACT

Disclosed are a vehicle and a control method thereof that may allow an occupant as well as a driver to conveniently use a speech recognition system by utilizing a microphone of a mobile device as a source of speech input, that may utilize a microphone of a mobile device as a source of noise collection, when a driver uses a speech recognition system. A vehicle may include a microphone; a speaker; a communication module configured to communicate with a mobile device; and a controller. In a first mode, the communication module is configured to receive a voice signal of a user from the mobile device, and in the first mode, the controller is configured to perform noise cancellation on the user's voice signal received from the mobile device, based on an audio signal input to the microphone.

18 Claims, 15 Drawing Sheets

(56) References Cited

U.S. PATENT DOCUMENTS

2022/0036877 A1    2/2022   Baba et al.
2022/0153177 A1*   5/2022   Jadhav ................. H04R 29/004

FOREIGN PATENT DOCUMENTS

| | | | | |
|---|---|---|---|---|
| JP | 2009010593 A | * | 1/2009 | |
| KR | 19980023857 A | | 7/1998 | |
| KR | 100553557 B1 | | 2/2006 | |
| KR | 20100029591 A | | 3/2010 | |
| KR | 20160037484 A | | 4/2016 | |
| KR | 20200117831 A | | 10/2020 | |
| KR | 20210066985 A | | 6/2021 | |
| WO | WO-0065873 A1 | * | 11/2000 | ........... H04R 25/502 |
| WO | WO-2005069279 A1 | * | 7/2005 | .............. H04M 1/19 |
| WO | 2020079733 A1 | | 4/2020 | |

* cited by examiner

VEHICLE AND CONTROL METHOD THEREOF

CROSS-REFERENCE TO RELATED APPLICATION

This application is based on and claims priority under 35 U.S.C. § 119 to Korean Patent Application No. 10-2022-0017057, filed on Feb. 9, 2022, in the Korean Intellectual Property Office, the entire contents of which are incorporated herein by reference.

BACKGROUND

1. Technical Field

The present disclosure relates to a vehicle and a control method thereof that may provide a service corresponding to a user's speech.

2. Description of the Related Art

A speech recognition system is capable of identifying what is intended by a user from a user's speech and providing a service corresponding to the identified user intention.

A speech recognition system is linked to a specific device to control the device and provide specific information according to a user intention.

Because a vehicle is equipped with a speech recognition system, a user may control the vehicle, obtain desired information or be provided with desired services simply through dialogues with the vehicle.

However, because a speech recognition system in a vehicle is designed to be used mainly by a driver, an occupant in the car has limitations in using the speech recognition system.

SUMMARY

An aspect of the disclosure provides a vehicle and a control method thereof that may allow an occupant as well as a driver to conveniently use a speech recognition system by utilizing a microphone of a mobile device as a source of speech input.

An aspect of the disclosure provides a vehicle and a control method thereof that may utilize a microphone of a mobile device as a source of noise collection when a driver uses a speech recognition system.

Additional aspects of the disclosure are set forth in part in the description which follows and, in part, should be apparent from the description or may be learned by practice of the disclosure.

According to an aspect of the present disclosure, a vehicle includes: a microphone provided inside the vehicle; a speaker provided inside the vehicle; a communication module configured to communicate with a mobile device located inside the vehicle; and a controller. In particular, in a first mode, the communication module is configured to receive a voice signal of a user from the mobile device, and in the first mode, the controller is configured to perform noise cancellation on the user's voice signal received from the mobile device, based on an audio signal input to the microphone.

In another embodiment, in a second mode, the communication module is configured to receive an audio signal from the mobile device, and in the second mode, the controller is configured to perform noise cancellation on a voice signal of the user input to the microphone, based on the audio signal received from the mobile device.

In one embodiment, the controller is configured to control the speaker to output a test sound in a registration mode for registering the mobile device.

In another embodiment, in the registration mode, the controller is configured to calculate a delay of the mobile device based on a test sound signal, received from the mobile device after controlling the speaker to output the test sound, and map and store the calculated delay to the mobile device.

In one embodiment, in the first mode, the controller is configured to synchronize the audio signal input to the microphone and the user's voice signal received from the mobile device, based on the delay mapped to the mobile device.

In the second mode, the controller is configured to synchronize the user's voice signal input to the microphone and the audio signal received from the mobile device, based on the delay mapped to the mobile device.

In one embodiment, the controller is configured to operate in the first mode, when a speech recognition trigger signal is input to the mobile device, and operate in the second mode, when the speech recognition trigger signal is input to the vehicle.

In one embodiment, the communication module is configured to receive a voice signal of an occupant of the vehicle from the mobile device in the first mode, and the microphone is configured to receive a speech of a driver of the vehicle in the second mode.

In one embodiment, the communication module is configured to transmit the user's voice signal where the noise cancellation is performed to a speech recognition system.

When a command corresponding to the user's voice signal received from the mobile device is allowable, the controller is configured to generate a control signal for performing the command, and when the command corresponding to the user's voice signal received from the mobile device is not allowable, generate a guide message.

According to an aspect of the present disclosure, a control method of a vehicle includes: determining a first mode or a second mode related to a speech recognition; when the first mode is in operation, receiving a voice signal of a user from a mobile device located inside the vehicle; and when the first mode is in operation, performing noise cancellation on the user's voice signal received from the mobile device, based on an audio signal input to a microphone provided in the vehicle.

In one embodiment, the control method further includes: when the second mode is in operation, receiving an audio signal from the mobile device; and when the second mode is in operation, performing noise cancellation on a voice signal of the user input to the microphone, based on the audio signal received from the mobile device.

The control method further includes registering the mobile device in the vehicle.

In one embodiment, the registering of the mobile device in the vehicle includes controlling a speaker, provided in the vehicle, to output a test sound.

In one embodiment, the registering of the mobile device in the vehicle further includes: calculating a delay of the mobile device based on a test sound signal, received from the mobile device after controlling the speaker to output the test sound; and mapping and storing the calculated delay to the mobile device.

In one embodiment, the performing of noise cancellation includes, when the first mode is in operation, synchronizing the audio signal input to the microphone and the user's voice signal received from the mobile device, based on the delay mapped to the mobile device.

In one embodiment, the performing of noise cancellation includes, when the second mode is in operation, synchronizing the user's voice signal input to the microphone and the audio signal received from the mobile device, based on the delay mapped to the mobile device.

In one embodiment, the determining of the first mode or the second mode related to the speech recognition includes: determining as the first mode when a speech recognition trigger signal is input to the mobile device and determining as the second mode when the speech recognition trigger signal is input to the vehicle.

In one embodiment, when the first mode is in operation, the user's voice signal received from the mobile device includes a voice signal of an occupant of the vehicle, and when the second mode is in operation, the user's voice signal input to the microphone includes a voice signal of a driver of the vehicle.

In one embodiment, the control method further includes: when a command corresponding to the user's voice signal received from the mobile device is allowable, generating a control signal for performing the command; and when the command corresponding to the user's voice signal received from the mobile device is not allowable, generating a guide message.

BRIEF DESCRIPTION OF THE DRAWINGS

These and/or other aspects of the disclosure should become apparent and more readily appreciated from the following description of embodiments, taken in conjunction with the accompanying drawings of which.

DETAILED DESCRIPTION

Figure 1:
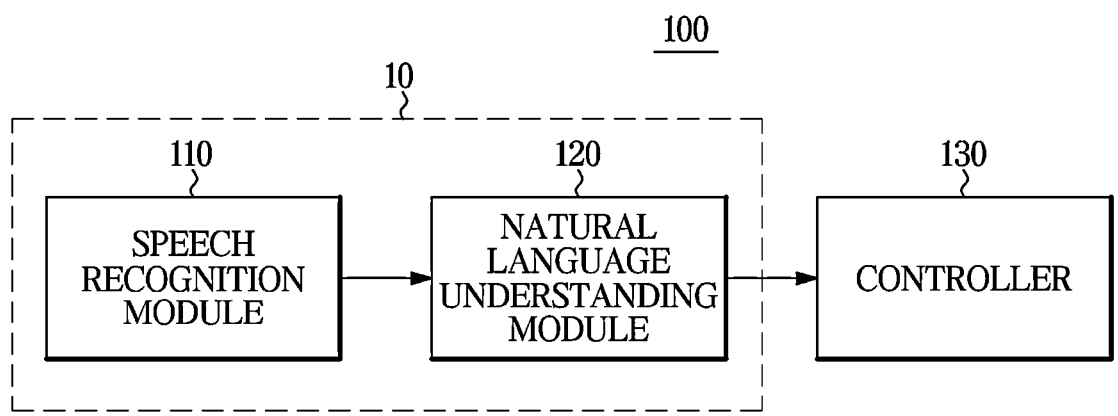
FIG. 1 is a block diagram illustrating a speech recognition system connected to a vehicle according to an embodiment.

It should be understood that embodiments may be replaced with various equivalents and modifications at the time of the disclosure.

Terminologies used herein are for the purpose of describing particular embodiments only and are not intended to limit the disclosure. It should be understood that the singular forms are intended to include the plural forms as well, unless the context clearly dictates otherwise. It should be further understood that the terms "include," "comprise" and/or "have" when used in this specification, specify the presence of stated features, integers, steps, operations, elements, and/or components, but do not preclude the presence or addition of one or more other features, integers, steps, operations, elements, components, and/or groups thereof.

Further, the terms such as "part," "device," "block," "member," "module," and the like, may refer to a unit for processing at least one function or act. For example, the terms may refer to at least process processed by at least one hardware, such as field-programmable gate array (FPGA)/ application specific integrated circuit (ASIC), software stored in memories or processors.

It should be understood that, although the terms "first," "second," and the like, may be used herein to describe various elements, these elements should not be limited by these terms. When a component, device, element, or the like of the present disclosure is described as having a purpose or performing an operation, function, or the like, the component, device, or element should be considered herein as being "configured to" meet that purpose or to perform that operation or function.

Reference numerals used for method steps are just used for convenience of explanation, but the reference numerals are not used to limit an order of the steps. Thus, unless the context clearly dictates otherwise, the written order may be practiced otherwise.

The term "at least one" used herein includes any and all combinations of the associated listed items. For example, it should be understood that the term "at least one of a, b, or c" may include only a, only b, only c, both a and b, both a and c, both b and c, or all of a, b and c.

Embodiments can be stored in the form of a recording medium storing computer-executable instructions. The instructions may be stored in the form of a program code, and when executed by a processor, the instructions may perform operations of the disclosed embodiments. The recording medium may be implemented as a computer-readable recording medium.

The computer-readable recording medium includes all kinds of recording media in which instructions which may be decoded by a computer are stored of, for example, a read only memory (ROM), random access memory (RAM), magnetic tapes, magnetic disks, flash memories, optical recording medium, and the like.

Embodiments of a vehicle and a control method thereof should be described in detail with reference to the accompanying drawings.

FIG. 1 is a block diagram illustrating a speech recognition system connected to a vehicle according to an embodiment.

In an embodiment, a speech recognition system connected to a vehicle may refer to a speech recognition system that may be used when called from the vehicle.

Referring to FIG. 1, a speech recognition system 100 includes a speech processing module 10 that extracts information required to perform a control intended by a user from a voice signal of the user, and a controller 130 that generates a control signal for performing the control intended by the user.

The speech processing module 10 may include a speech recognition module 110 converting a user's speech into text and a natural language understanding module 120 determining a user intention corresponding to the text.

The speech recognition module 110 may be implemented with a speech to text (STT) engine and perform conversion into text by applying a speech recognition algorithm to the user's speech.

For example, the speech recognition module 110 may extract feature vectors from a user's speech by applying a feature vector extraction method such as a cepstrum, a linear predictive coefficient (LPC), a Mel frequency cepstral coefficient (MFCC), a filter bank energy, or the like.

Also, a recognition result may be obtained by comparing extracted feature vectors and trained reference patterns. An acoustic model for modeling and comparing signal characteristics of voice or a language model for modeling a linguistic order of recognition vocabulary such as words or syllables may be used.

In addition, the speech recognition module 110 may convert the user's speech into the text based on learning where deep learning or machine learning is applied. According to an embodiment, a way of converting the user's speech into the text by the speech recognition module 110 is not limited thereto, and a variety of speech recognition techniques may be applied to convert the user's speech into the text.

The natural language understanding module 120 may apply a natural language understanding (NLU) technique to determine user intention included in the text. Accordingly, the natural language understanding module 120 may include an NLU engine that determines the user intention by applying the NLU technique to an input sentence. The text output by the speech recognition module 110 may be a sentence input to the natural language understanding module 120.

For instance, the natural language understanding module 120 may recognize an entity name from the input sentence. The entity name is a proper noun such as a name of an individual person, place, organization, time, day, currency, and the like. Named-entity recognition is for identifying an entity name in a sentence and classifying a type of the identified entity. A keyword may be extracted from a sentence through named-entity recognition to understand the meaning of the sentence.

Also, the natural language understanding module 120 may determine a domain from the input sentence. The domain may be for identifying a subject of the user's speech. For example, domains representing various subjects such as a vehicle control, schedule, information about weather or traffic conditions, text transmission, navigation, and the like, may be determined based on the input sentence.

In addition, the natural language understanding module 120 may analyze a speech act of the input sentence. Speech act analysis is for analyzing an intention of speech, such as whether the user asks a question, makes a request, responds, or simply expresses the user's emotions.

The natural language understanding module 120 may determine an intent and an entity required to perform the intent, based on the domain, entity name, speech act extracted from the input sentence. For example, when the input sentence is "turn on the air conditioner," the domain may be [vehicle control] and the intent may be [turn on, air conditioner]. [Turn on] may be an action, [air conditioner] may be a target, and the entity required to perform control corresponding to such intent may be [temperature, air volume].

The controller 130 may perform processing on the result of the speech recognition and natural language understanding and output a result processing signal to a user terminal or an external server, in order to provide a service corresponding to a user intention. For example, the controller 130 may generate and output a control signal for performing a control corresponding to an intent extracted from a user's speech.

The user terminal may serve as a gateway between the user and the speech recognition system 100. The user terminal may be a mobile device provided with an input/output interface such as a microphone, a speaker, a display, and the like, or be a vehicle itself. When the user terminal is a mobile device, the vehicle and the mobile device may be connected to each other through a wireless communication such as Bluetooth™, or through a cable connection.

For example, when a service corresponding to a user intention is a vehicle-related control, the controller 130 may generate a control signal for performing the corresponding control and transmit the control signal to the user terminal.

Alternatively, when a service corresponding to a user intention is provision of specific information, the controller 130 may search for the specific information and transmit the retrieved information to the user terminal. Information retrieval may be performed by an external server, when required.

Alternatively, when a service corresponding to a user intention is provision of specific content, the controller 130 may request to an external server providing the corresponding content.

Alternatively, when a service corresponding to a user intention is simply continuation of a dialogue, the controller 130 may generate a response to a user's speech and output the response by voice.

The above-described speech recognition system 100 may be implemented with at least one memory storing a program performing the aforementioned operations and at least one processor implementing a stored program.

The constituent components of the speech recognition system 100 illustrated in FIG. 1 are divided based on their operation or function, and all or a portion of the constituent components may share the memory or processor. The speech recognition module 110, the natural language understanding module 120, and the controller 130 are not necessarily physically separated from each other.

Figure 2:
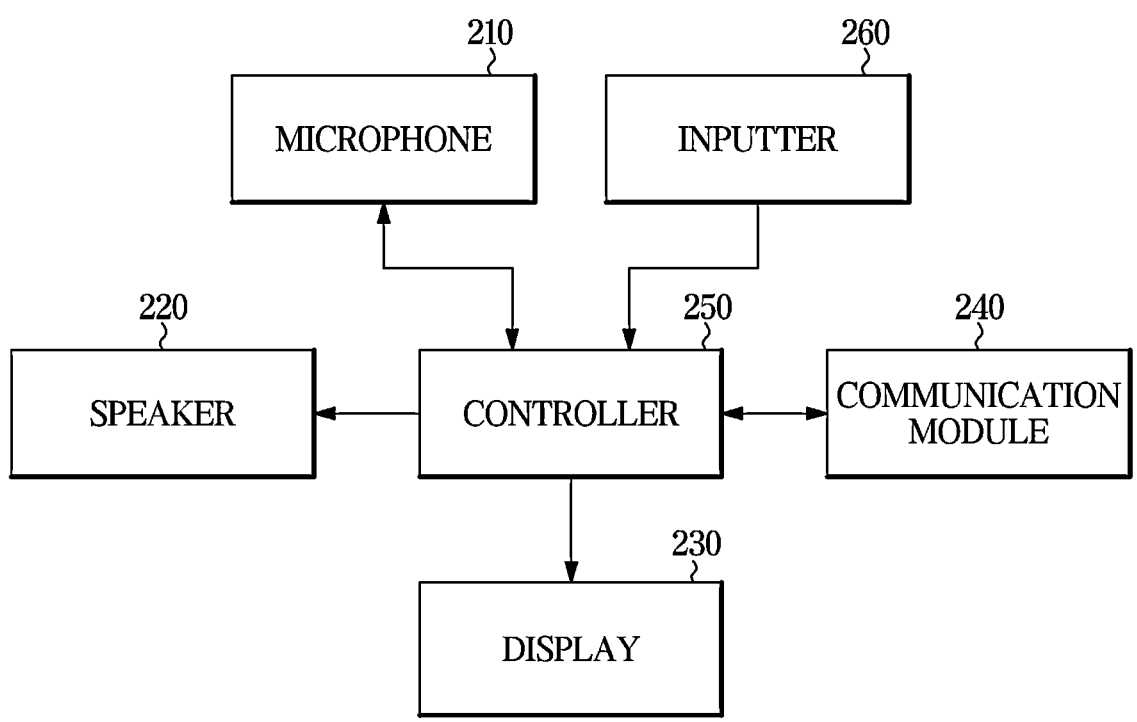
FIG. 2 is a block diagram illustrating a vehicle according to an embodiment.
Figure 3:
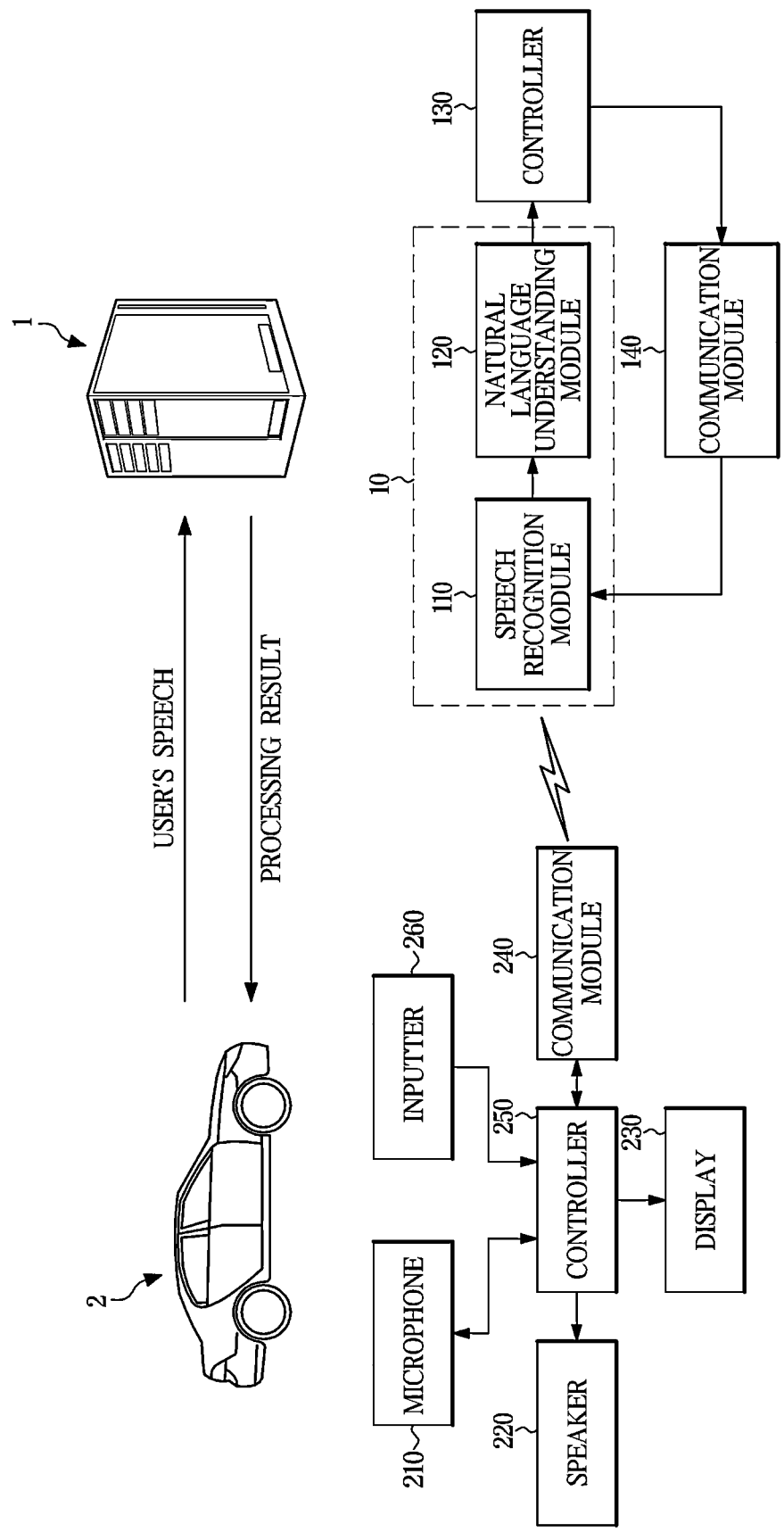
FIG. 3 is a diagram schematically illustrating a relationship between a speech recognition system and a vehicle according to an embodiment.

FIG. 2 is a block diagram illustrating a vehicle according to an embodiment, and FIG. 3 is a diagram schematically illustrating a relationship between a vehicle and a speech recognition system according to an embodiment.

Referring to FIG. 2, a vehicle 2 includes: a microphone 210 to which a user's speech is input; a speaker 220 outputting a sound required to provide a service desired by a user; a display 230 displaying an image required to provide a service desired by the user; a communication module 240 performing communication with an external device; and a controller 250 controlling the above-described constituent components and other constituent components of the vehicle 2.

The microphone 210 may be provided inside the vehicle 2 to receive a user's speech. The user that inputs the user's speech to the microphone 210 of the vehicle 2 may be a driver. The microphone 210 may be provided on a steering wheel, a center console, a headliner, or a rear-view mirror, and the like, to receive a speech from the driver.

Various audios generated around the microphone 210 may be input to the microphone 210 in addition to the user's speech. The microphone 210 may output an audio signal corresponding to the audio input to the microphone 210, and the output audio signal may be processed by the controller 250 or transmitted to the speech recognition system 100 through the communication module 240.

The vehicle 2 may also include an inputter 260 for manually receiving a user command in addition to the microphone 210. The inputter 260 may include an inputter provided as a jog shuttle or a button, in an area where an audio, video, navigation (AVN) is provided on a center console, in an area where a gearbox is provided, or on a steering wheel.

Also, to receive a control command related to passenger seats, the inputter 260 may include an inputter provided on each door of the vehicle 2, and an inputter provided on a front armrest or a rear armrest.

Further, the inputter 260 may include a touchpad like a touchscreen by being provided integrally with the display 230.

The display 230 may include an AVN display provided on a center console of the vehicle 2, a cluster display, or a head-up display (HUD). Alternatively, the display 230 may include a rear seat display provided on a back of the front seat's headrest so that a rear occupant may see the rear seat display. When the vehicle 2 is a multi-seater vehicle, the display 230 may include a display mounted on a headliner of the vehicle 2.

The display 230 may be provided anywhere as long as users inside the vehicle 2 may see the display 230, and the position or the number of displays 230 are not limited.

The communication module 240 may transmit and receive a signal with other devices by using at least one of various wireless communication methods, such as Bluetooth™, fourth-generation wireless (4G), fifth-generation wireless (5G), wireless-fidelity (Wi-Fi), and the like. Alternatively, the communication module 240 may transmit and receive information with other devices through a cable connected to a universal serial bus (USB) terminal, an auxiliary port (AUX) terminal, and the like.

Also, the communication module 240 may be provided with two or more communication interfaces that support different communication methods to transmit and receive information with two or more other devices.

For example, the communication module 240 may communicate with a mobile device located inside the vehicle 2 through a Bluetooth™ communication, thereby receiving information (user images, user speech, contact numbers, schedules, and the like) obtained by or stored in the mobile device. Also, the communication module 240 may communicate with a server 1 through a 5G communication method, thereby transmitting a user's speech and receiving a signal required to provide a service desired by the user. In addition, the communication module 240 may transmit and receive a signal with the server 1 through a mobile device connected to the vehicle 2.

Further, the vehicle 2 may include: a navigation device for route guidance; an air conditioning device for adjusting an indoor temperature; a window adjustment device for opening/closing vehicle windows; a seat heating device for heating seats; a seat adjustment device for adjusting a position, height, angle of a seat; a lighting device for adjusting an indoor illuminance level; and the like.

The aforementioned constituent components are for providing convenience functions related to the vehicle 2, and a portion of the constituent components may be omitted depending on models or options. Also, other constituent components may be further included in the vehicle 2 in addition to the above constituent components. Configurations related to driving of the vehicle 2 are well-known, and thus a description thereof is omitted herein.

The controller 250 may turn on or off the microphone 210, process and store a speech input to the microphone 210 and transmit to another device through the communication module 240.

Also, the controller 250 may control the display 230 to display an image and control the speaker 220 to output a sound.

In addition, the controller 250 may perform various controls related to the vehicle 2. For example, the controller 250 may control at least one of: the navigation device; the air conditioning device; the window adjustment device; the seat heating device; the seat adjustment device; or the lighting device, according to a user command input through the inputter 260 or the microphone 210.

The controller 250 may include at least one memory storing a program performing the aforementioned operations or operations to be described below and at least one processor implementing a stored program.

Referring to FIG. 3, the speech recognition system 100 may be provided in the server 1. Accordingly, a user's speech input to the vehicle 2 may be transmitted to a communication module 140 of the server 1, and when a voice signal is processed by the speech recognition system 100 provided in the server 1, the communication module 140 may transmit a processing result to the vehicle 2 again.

The communication module 140 may transmit and receive a signal with other devices by using at least one of various wireless communication methods, such as Bluetooth™, 4G, 5G, Wi-Fi, and the like.

A portion of the constituent components of the speech recognition system 100 may be provided in the vehicle 2, and the other constituent components may be provided in the server 1.

For example, the speech recognition module 110 may be provided in the vehicle 2, and the natural language understanding module 120 and the controller 130 may be provided in the server 1.

As another example, the speech recognition module 110 and the controller 130 may be provided in the vehicle 2 and the natural language understanding module 120 may be provided in the server 1, or the speech recognition module 110 and the natural language understanding module 120 may be provided in the server 1 and the controller 130 may be provided in the vehicle 2.

As another example, the speech recognition system 100 may be provided in the vehicle 2.

Although all or a portion of the constituent components of the speech recognition system 100 may be provided in the vehicle 2 as described above, an example where the speech recognition system 100 is provided in the server 1, as shown in FIG. 3, is described in the below-described embodiment.

As described above, the microphone 210 to which a user's speech is input is provided in the vehicle 2, and an audio signal output from the microphone 210 is transmitted to the speech recognition system 100 and is used to determine a user intention. Also, according to an embodiment, by using a microphone of a mobile device located inside the vehicle 2 as a microphone for receiving a speech of an occupant other than a driver, the occupant may also conveniently use the speech recognition system 100 connected to the vehicle 2. Thus, because a separate microphone for receiving an occupant's speech is not required for the vehicle 2, convenience of the vehicle may be improved, and cost reduction may be achieved.

Figure 4:
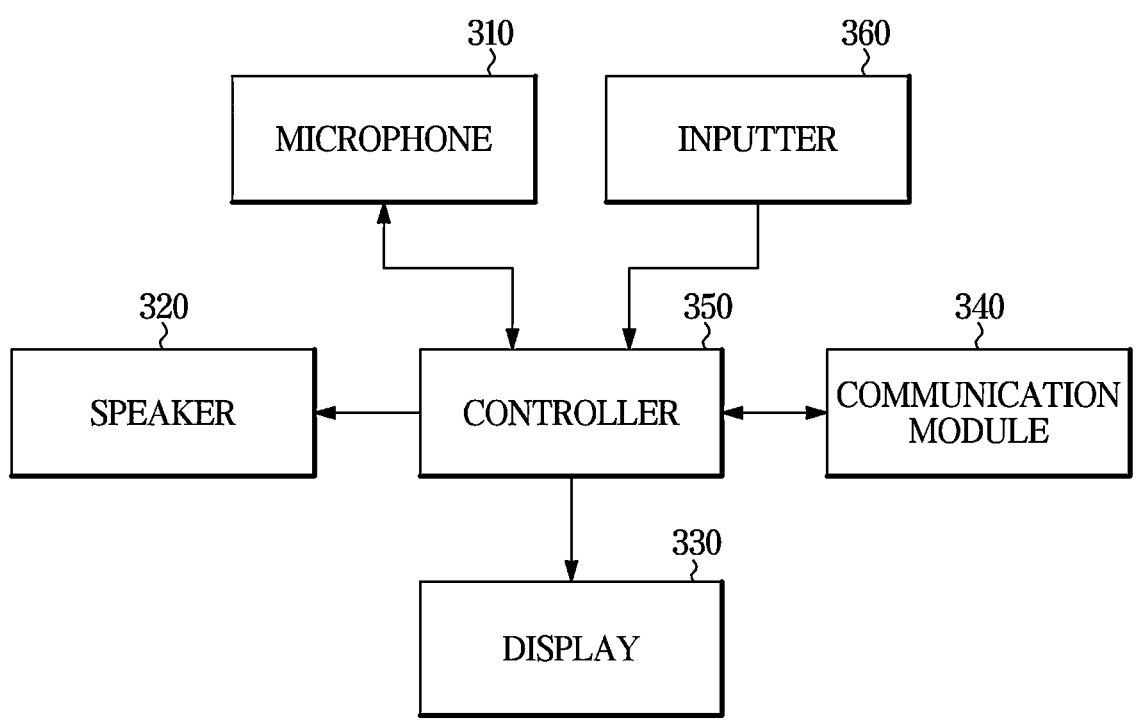
FIG. 4 is a block diagram illustrating a mobile device providing a microphone to a vehicle according to an embodiment.

FIG. 4 is a block diagram illustrating a mobile device providing a microphone to a vehicle according to an embodiment.

Referring to FIG. 4, a mobile device 3 includes: a microphone 310; a speaker 320; a display 330; a communication module 340; a controller 350; and an inputter 360.

The mobile device 3 may be a smartphone, a tablet, a laptop, or a wearable device such as a smart watch or smart glasses.

A variety of audios including a user's voice may be input to the microphone 310 and the microphone 310 may output an audio signal corresponding to the input audio. The audio signal output from the microphone 310 may be used variously. The audio signal may be transmitted to the other party's device during a call and stored in a memory of the mobile device 3 during recording. Also, the audio signal may be transmitted to a speech recognition system connected to the mobile device 30.

In addition, when the mobile device 3 is connected to the vehicle 2 according to an embodiment, the audio signal output from the microphone 310 may be transmitted to the vehicle 2.

The display 330 may display screens required to perform various functions of the mobile device 30. For example, when the mobile device 3 is connected to the vehicle 2 according to an embodiment, a variety of screens accompanying execution of an application for connection with the vehicle 2 may be displayed.

The communication module 340 may transmit and receive a signal with other devices by using at least one of various wireless communication methods, such as Bluetooth™, 4G, 5G, Wi-Fi, and the like. Alternatively, the communication module 340 may transmit and receive a signal with other devices through a cable connected to a USB terminal, an AUX terminal, and the like.

For example, the communication module 340 may be connected to the vehicle 2 through a Bluetooth™ communication. When connected to the vehicle 2, the communication module 340 may transmit information requested from the vehicle 2 to the vehicle 2.

For instance, the communication module 340 may transmit information such as contact numbers, call history, or text history stored in the mobile device 3 to the vehicle 2. Alternatively, as is described below, the communication module 340 may transmit the audio signal output from the microphone 310 to the vehicle 2.

A user may also input a desired command to the mobile device 3 by voice. The mobile device 3 may be connected to a speech recognition system, and thus the speech recognition system connected to the mobile device 3 may be different from or the same as the speech recognition system 100 connected to the vehicle 2.

When a user inputs a user's speech to the microphone 310 to control the mobile device 3, the audio signal output from the microphone 310 may be transmitted to the speech recognition system through the communication module 340.

The transmitted audio signal may be processed by the speech recognition system, and when a control signal for performing a control corresponding to a user intention is received from the speech recognition system, the mobile device 3 may control the constituent components according to the received control signal.

The mobile device 3 may include an inputter 360 for manually receiving a command other than a voice command through manipulation, like the vehicle 2. The inputter 360 may include a device like a button provided on an exterior of the mobile device 3, or a touchpad like a touchscreen provided integrally with the display 330.

Figure 5:
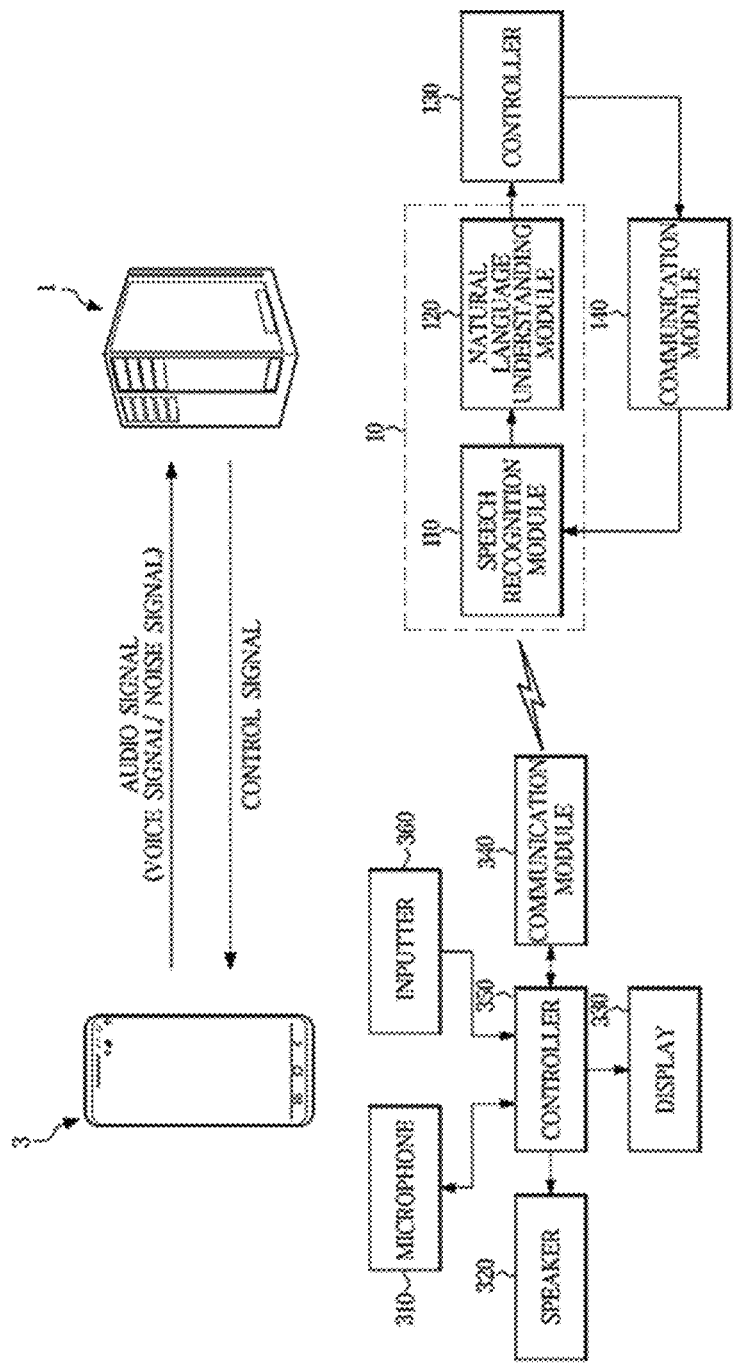
FIG. 5 is a diagram illustrating types of signals exchanged between a vehicle according to an embodiment and a mobile device connected thereto.

FIG. 5 is a diagram illustrating types of signals exchanged between a vehicle according to an embodiment and a mobile device connected thereto.

After the vehicle 2 according to an embodiment and the mobile device 3 located in the vehicle 2 are connected to each other by wire or wirelessly, when operations to be described below are performed, a microphone of the mobile device 3 may be used as a microphone for receiving an occupant's speech or collecting noise, as shown in FIG. 5. Accordingly, the mobile device 3 may provide the vehicle 2 with an audio signal including a voice signal or a noise signal.

Also, the vehicle 2 may transmit to the mobile device 3, a control signal as to which microphone of the vehicle 2 or the mobile device 3 is used for speech input or noise collection.

As is described below, an audio signal may be transmitted or received through an audio channel between the vehicle 2 and the mobile device 3, and a control signal may be transmitted or received through a control channel between the vehicle 2 and the mobile device 3.

A user may install a dedicated application for sharing a microphone with the vehicle 2 in the mobile device 3, in order to use the microphone of the mobile device 3 as described above. Among the operations to be described below, operations performed by the mobile device 3 may be performed by executing the installed application.

Figure 6:
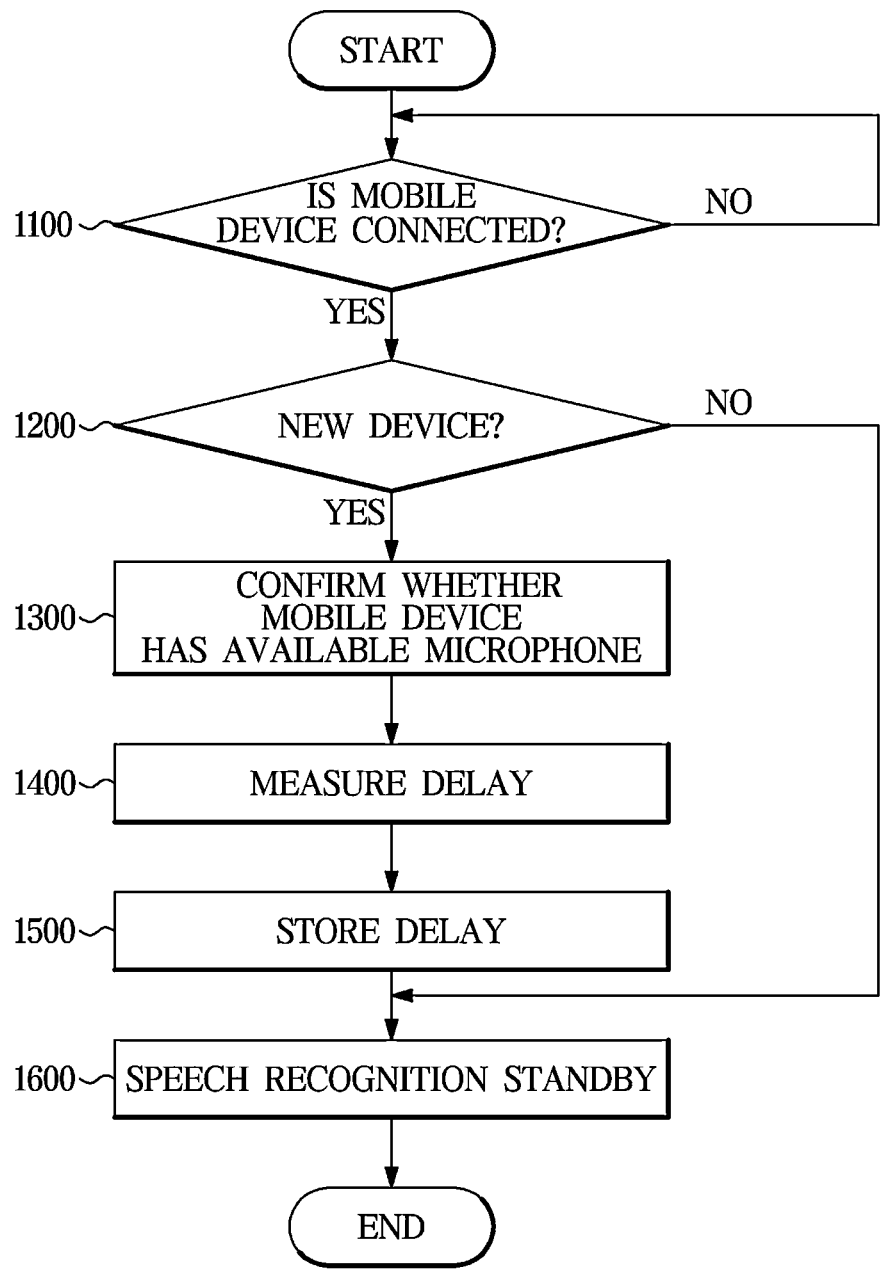
FIG. 6 is a flowchart illustrating operations of registering a mobile device in a vehicle, in a control method of the vehicle according to an embodiment.
Figure 7:
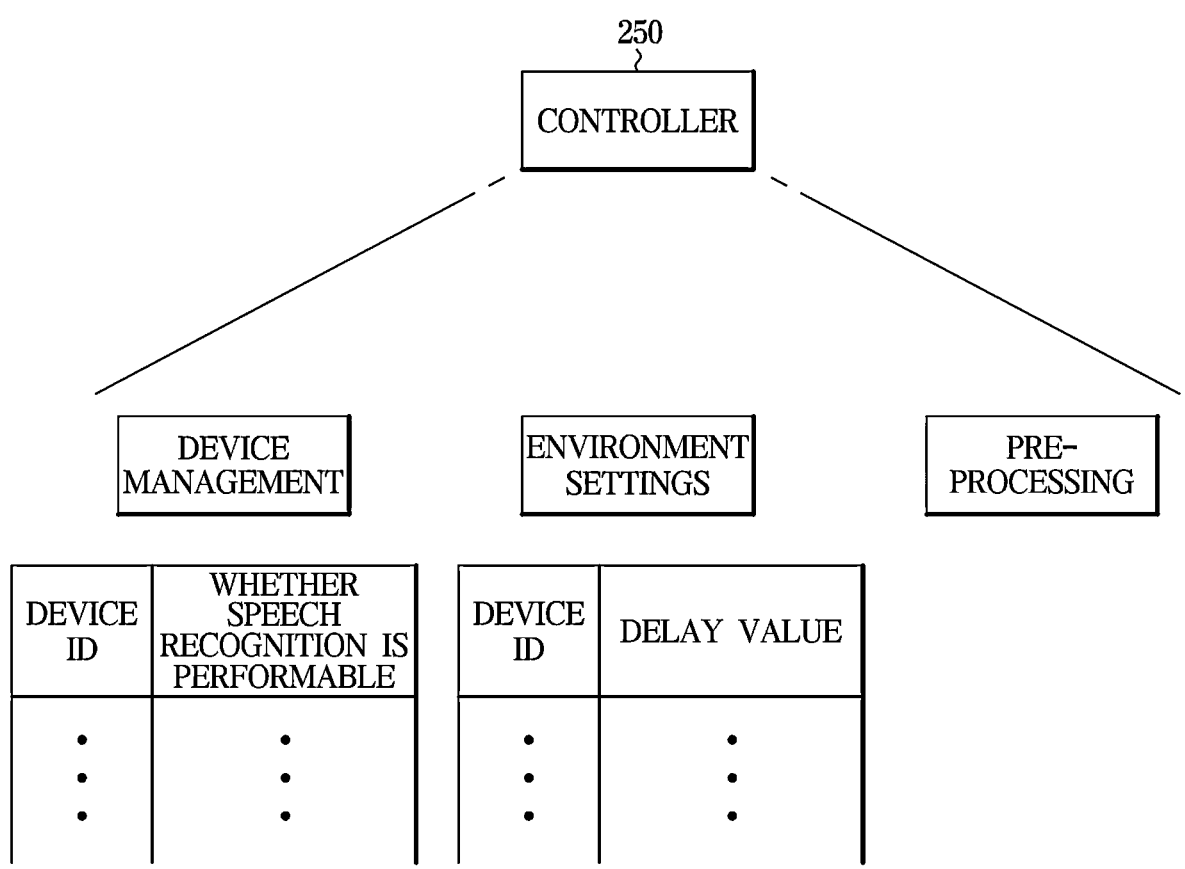
FIG. 7 is a diagram illustrating operations of a controller of a vehicle according to an embodiment.

FIG. 6 is a flowchart illustrating operations of registering a mobile device in a vehicle, in a control method of a vehicle according to an embodiment. FIG. 7 is a diagram illustrating operations of a controller of a vehicle according to an embodiment.

A control method of a vehicle according to an embodiment refers to a control method of the vehicle 2 according to an embodiment. Accordingly, the control method of a vehicle according to an embodiment may be performed by the vehicle 2, and a description of operations of the vehicle 2 are equally applicable to embodiments of the control method of a vehicle, even when not specifically described below.

Referring to FIG. 6, it is confirmed whether the vehicle 2 and the mobile device 3 are connected (1100). The vehicle 2 and the mobile device 3 may be connected to each other through a wireless communication method such as Bluetooth™, or through a wired communication method using a cable.

When the mobile device 3 is connected (Yes in operation 1100), it is confirmed whether the mobile device 3 is a new device or an already registered device (1200).

When the mobile device 3 is a new device (Yes in operation 1200), a process for registering the newly connected mobile device 3 is performed, i.e., entering a registration mode.

First, it may be confirmed whether the connected mobile device 3 has an available microphone (1300). For example, it may be confirmed whether the mobile device 3 supports a hands-free profile, and when a hands-free profile is supported, it may be determined that an available microphone is provided in the mobile device 3 (Yes in operation 1300).

A delay of the mobile device 3 is measured (1400). In order for an audio input to the mobile device 3 to be used in the vehicle 2, a process of transmitting an audio from the mobile device 3 to the vehicle 2 is required, and a delay occurs in the above transmission process.

Accordingly, when the mobile device 3 is newly connected, the vehicle 2 may measure a delay between the mobile device 3 and the vehicle 2 (1400) and store the measured delay in the corresponding mobile device 3 (1500). When an audio signal, provided from the mobile device 3, is used, the stored delay may be used to synchronize with an audio signal output from the microphone 210 of the vehicle 2.

When the delay is stored and the microphone 310 of the mobile device 3 may be used for the vehicle 2, a speech recognition standby mode is entered (1600).

Referring to FIG. 7, the above-described operations may be performed by the controller 250 of the vehicle 2. The controller 250 of the vehicle 2 may be referred to as a head unit (HU) and include at least one memory and at least one processor.

As described above with reference to FIG. 6, the controller 250 may confirm whether the microphone 310 is present each time the new mobile device 3 is connected to the vehicle 2, and may register the new device in the vehicle 2 by mapping information about whether the microphone 310 is present to an identification (ID) of each mobile device 3 and storing in a memory.

Also, the controller 250 may measure a delay for the newly registered mobile device 3, map a delay value to the ID of each mobile device 3 and store in the memory.

In addition, the controller 250 may cancel noise by performing pre-processing on an audio signal output from the microphone 210 of the vehicle 2 or the microphone 310 of the mobile device 3, as described below.

Figure 8:
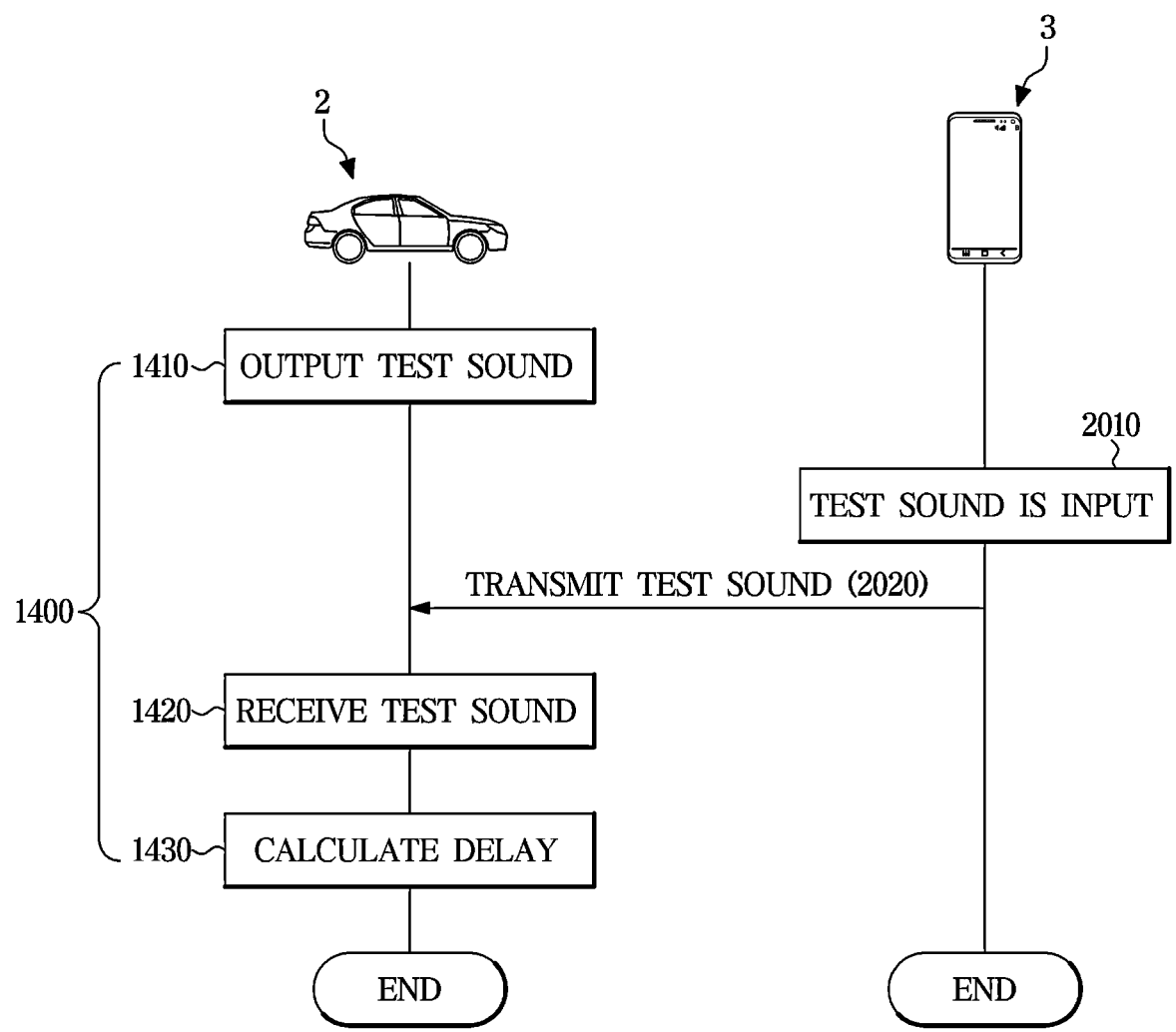
FIG. 8 is a flowchart illustrating operations of measuring a delay, in a control method of a vehicle according to an embodiment.
Figure 9:
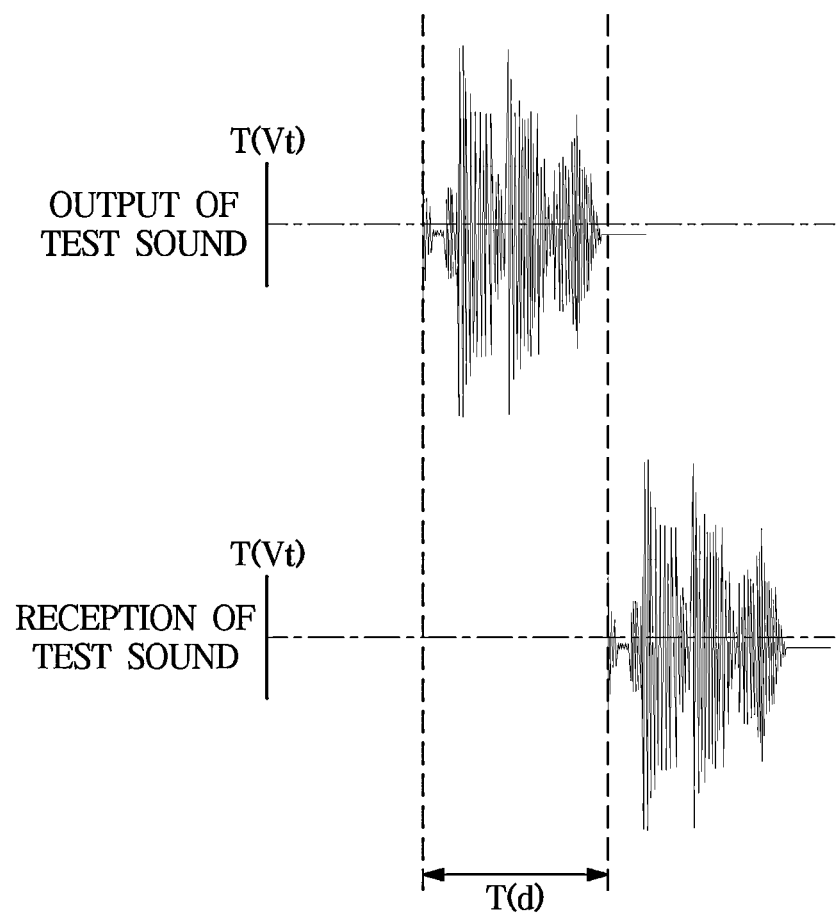
FIG. 9 is a diagram illustrating an example of a time difference between a test sound output from a vehicle according to an embodiment and a signal transmitted to the vehicle from a mobile device.

FIG. 8 is a flowchart illustrating operations of measuring a delay, in a control method of a vehicle according to an embodiment. FIG. 9 is a diagram illustrating an example of a time difference between a test sound output from a vehicle according to an embodiment and a signal transmitted to the vehicle from a mobile device.

Referring to FIG. 8, in order to measure the delay of the newly connected mobile device 3 (1400), the controller 250 of the vehicle 2 outputs a test sound through the speaker 220 (1410). The test sound is output to be input to the microphone 310 of the mobile device 3. Accordingly, before outputting the test sound, the vehicle 2 may transmit a control signal for opening the microphone 310 to the mobile device 3.

The test sound output from the speaker 220 of the vehicle 2 may be input to the open microphone 310 of the mobile device 3 (2010).

The mobile device 3 transmits the test sound input to the microphone 310 to the vehicle 2 through the communication module 340 (2020).

The communication module 240 of the vehicle 2 receives the test sound transmitted from the mobile device 3 (1420). A communication method used by the communication module 240 of the vehicle 2 and the communication module 340 of the mobile device 3 for transmission and reception of the test sound is the same as that used for transmission and reception of an audio signal later.

The controller 250 of the vehicle 2 calculates a delay based on the received test sound (1430). As shown in FIG. 9, a time difference between a time point when the vehicle 2 outputs the test sound through the speaker 220 and a time point when the test sound is received again from the mobile device 3, i.e., a delay T(d), exists.

As described above, the controller 250 stores the calculated delay value T(d) in the memory, and when an audio signal is received from the mobile device 3 later, the stored delay value may be used for synchronization with an audio signal output from the microphone 210 of the vehicle 2.

Figure 10:
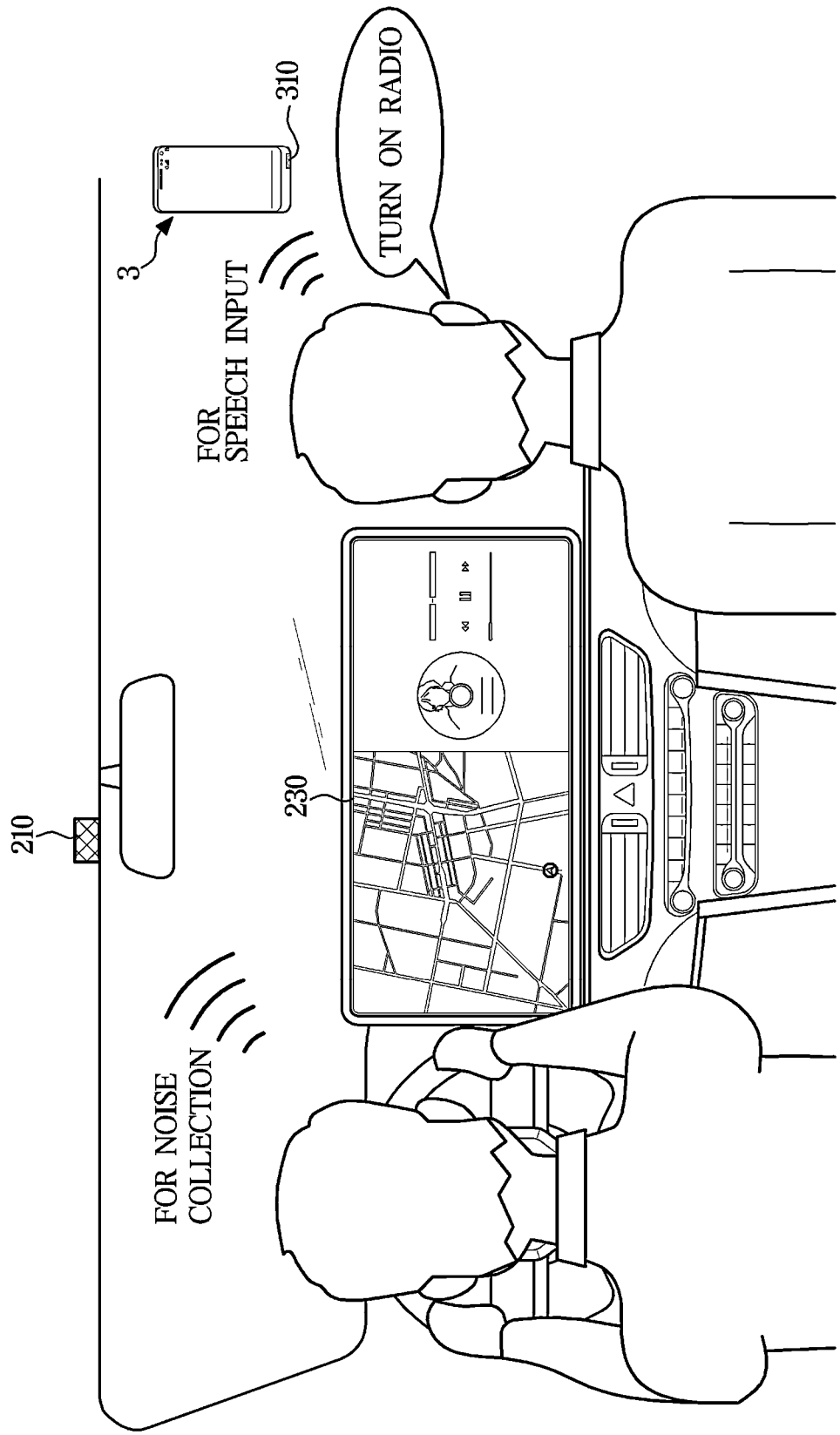
FIG. 10 is a diagram illustrating an example where a microphone of a vehicle according to an embodiment is used for speech input and a microphone of a mobile device is used for noise collection.
Figure 11:
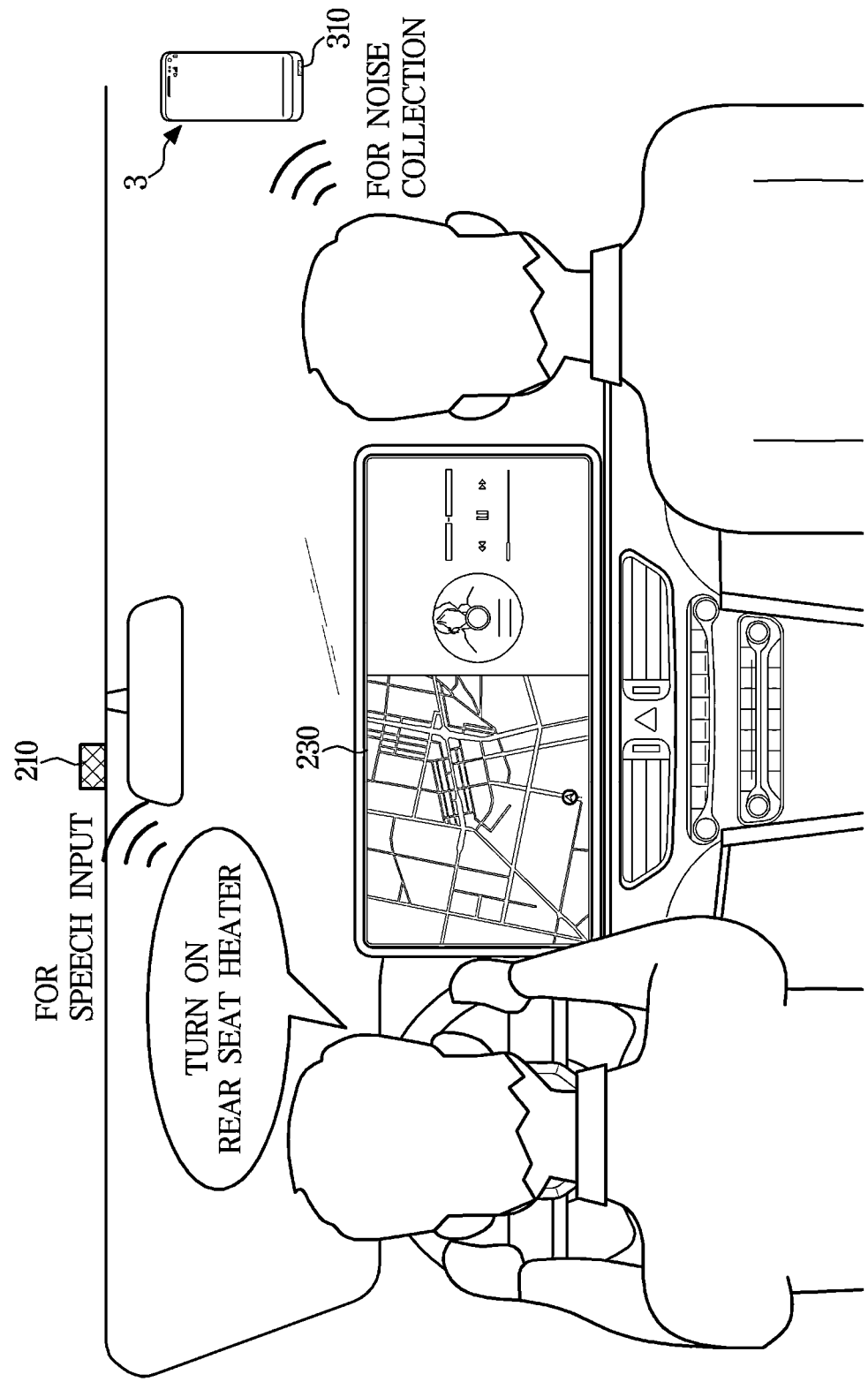
FIG. 11 is a diagram illustrating an example where a microphone of a vehicle according to an embodiment is used for noise collection and a microphone of a mobile device is used for speech input.

FIG. 10 is a diagram illustrating an example where a microphone of a vehicle according to an embodiment is used for speech input and a microphone of a mobile device is used for noise collection. FIG. 11 is a diagram illustrating an example where a microphone of a vehicle according to an embodiment is used for noise collection and a microphone of a mobile device is used for speech input.

Referring to an example of FIG. 10, when a speech recognition is triggered by an occupant which is a user of the mobile device 3, the microphone 310 of the mobile device 3 connected to the vehicle 2 may be used for speech input, and the microphone 210 of the vehicle 2 may be used for noise collection.

The occupant may input a speech command to the microphone 310 of the mobile device 3, and while the occupant inputs the occupant's speech command to the microphone 310 of the mobile device 3, the microphone 210 of the vehicle 2 may collect noise.

The speech command input to the mobile device 3 may be transmitted to the vehicle 2, and the vehicle 2 may cancel noise from the transmitted speech command using the collected noise.

Referring to an example of FIG. 11, when a speech recognition is triggered by a driver, the microphone 210 of the vehicle 2 may be used for speech input, and the occupant's mobile device 3 connected to the vehicle 2 may be used for noise collection.

The driver may input a speech command for controlling the vehicle 2 to the microphone 210 of the vehicle 2, and while the driver inputs the driver's speech command to the microphone 210 of the vehicle 2, the occupant's mobile device 3 connected to the vehicle 2 may collect noise.

The collected noise is transmitted to the vehicle 2 and may be used to cancel noise from the driver's speech input to the vehicle 2.

The mobile device 3 connected to the vehicle 2 may be a mobile device of the occupant or a mobile device of the driver. For example, when the driver is driving with the mobile device 3 placed in a passenger seat, the microphone 210 of the vehicle 2 may be used for speech input, and the mobile device 3 may be used for noise collection.

According to the above-described embodiments, a microphone which is not used for speech input among the microphone 210 of the vehicle 2 and the microphone 310 of the mobile device 3 may be used for noise collection, thereby effectively cancelling noise without adding an additional microphone.

Operations of using the microphone 210 of the vehicle 2 and the microphone 310 of the mobile device 3 for speech recognition or noise collection are described in detail.

Figure 12:
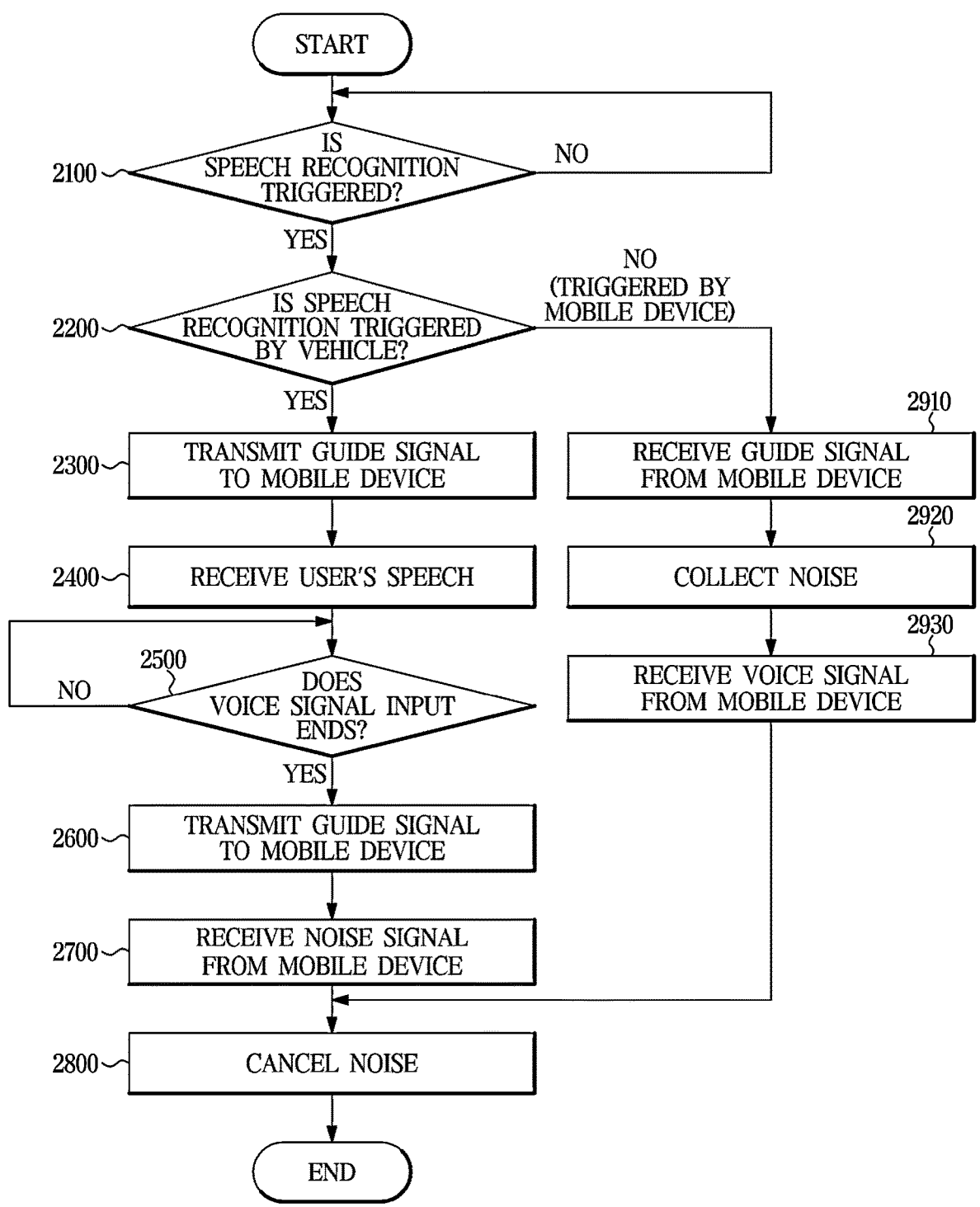
FIG. 12 is a flowchart illustrating operations where a vehicle uses an audio signal provided from a mobile device, in a control method of the vehicle according to an embodiment.
Figure 13:
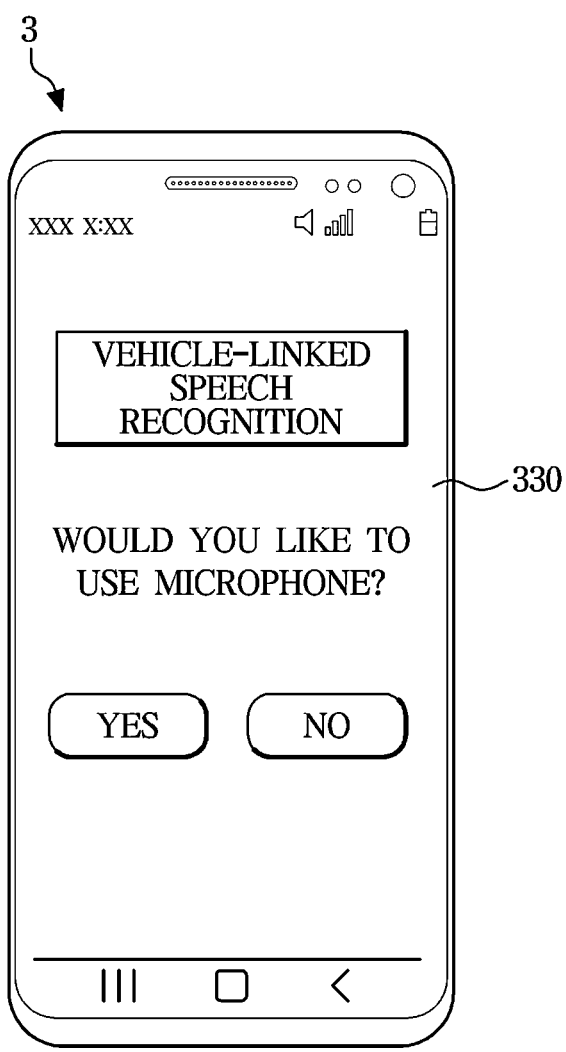
FIG. 13 is a diagram illustrating an example of a screen displayed on a mobile device, when speech recognition is triggered through the mobile device.

FIG. 12 is a flowchart illustrating operations where a vehicle uses an audio signal provided from a mobile device, in a control method of vehicle according to an embodiment. FIG. 13 is a diagram illustrating an example of a screen displayed on a mobile device, when speech recognition is triggered through the mobile device.

Referring to FIG. 12, when a speech recognition is triggered (Yes in operation 2100), it is determined whether the speech recognition is triggered by the vehicle (Yes in operation 2200) or the mobile device (No in operation 2200). When the speech recognition is triggered by the mobile device, a first mode where the microphone 310 of the mobile device 3 is used for speech recognition and the microphone 210 of the vehicle 2 is used for noise collection is entered. When the speech recognition is triggered by the vehicle, a second mode where the microphone 310 of the mobile device 3 is used for noise collection and the microphone 210 of the vehicle 2 is used for speech input is entered.

For example, when the speech recognition is triggered through a push to talk (PTT) button provided in the vehicle 2, or when a wake-up word which is a call word for calling the speech recognition system 100 is input to the microphone 210 of the vehicle 2, it may be determined that the speech recognition is triggered by the vehicle 2.

A dedicated application installed in the mobile device 3 may be executed to trigger the speech recognition through the mobile device 3. When running the application, as shown in an example of FIG. 13, a screen for asking whether to use a microphone may be displayed, and when a 'yes' button is selected, the microphone 310 may be open and the speech recognition may be triggered through the mobile device 3. A speech recognition trigger signal may be transmitted to the vehicle 2.

Alternatively, a user may utter a wake-up word for calling the speech recognition system used in the mobile device 3. By uttering the corresponding wake-up word, the microphone 310 of the mobile device 3 may be open and a speech recognition trigger signal may be transmitted to the vehicle 2.

The controller 350 of the mobile device 3 may recognize that the utterance of the wake-up word while connected to the vehicle 2 is a trigger signal for transmitting an audio signal to the vehicle 2, not a call of the speech recognition system connected to the mobile device 3. Accordingly, the controller 350 may transmit the audio signal output from the microphone 310 of the mobile device 3 to the vehicle 2 only, without transmitting to the speech recognition system connected to the mobile device 3.

When the speech recognition is triggered by the vehicle 2 (Yes in operation 2200), a guide signal may be transmitted to the mobile device 3 (2300).

The vehicle 2 and the mobile device 3 may use an audio channel for transmitting an audio signal and a control channel for mutual control. When the speech recognition is triggered by the vehicle 2, a noise signal may be received from the mobile device 3 through the audio channel, and when the speech recognition is triggered by the mobile device 3, a user's voice signal may be received from the mobile device 3 through the audio channel.

When the speech recognition is triggered by the vehicle 2 (Yes in operation 2200), the vehicle 2 transmits a guide signal for notifying a start of speech recognition to the mobile device through the control channel. The mobile device 3 may open the microphone 310 and collect noise through the microphone 310.

The microphone 210 of the vehicle 2 receives a user's speech (2400). The user's speech may be a driver's speech.

When a speech input of the user ends (Yes in operation 2500), a guide signal for notifying that the speech input has ended is transmitted to the mobile device 3 (2600).

When receiving the guide signal, the mobile device 3 may close the microphone 310 and transmit a collected noise signal to the vehicle 2.

The vehicle 2 may receive the noise signal from the mobile device 3 (2700) and cancel noise from the user's voice signal based on the received noise signal (2800).

The controller 250 synchronizes a noise signal Noise(d), collected by the microphone 310 of the mobile device 3, to a voice signal Voice(D), output from the microphone 210 of the vehicle 2, using a delay value T(d) of the mobile device 3 stored in the memory. As given by Equation (1) below, by cancelling the synchronized noise signal Noise(ds) from the user's voice signal Voice(D), the pre-processed voice signal (Vcmd), i.e., the noise-cancelled voice signal, may be obtained.

$$Vcmd = Voice(D) - Noise(ds) \qquad (1)$$

When the speech recognition is triggered by the mobile device 3 (No in operation 2200), the vehicle 2 receives the guide signal for notifying a start of speech recognition from the mobile device 3 through the control channel (2910). The mobile device 3 may open the microphone 310 and receive a user's speech through the microphone 310. The user's speech may be an occupant's speech.

The vehicle 2 may open the microphone 210 and collect noise (2920).

When a speech input of the user ends, the mobile device 3 transmits the input user's speech to the vehicle 2, and the vehicle 2 receives the voice signal from the mobile device 3 (2930).

While the user's speech is input to the microphone 310 of the mobile device 3, the microphone 210 of the vehicle 2 collects noise.

The controller 250 of the vehicle 2 may cancel noise from the user's voice signal based on the received noise signal (2800).

The controller 250 synchronizes a noise signal Noise(D), collected by the microphone 210 of the vehicle 2, to a voice signal Voice(d), transmitted from the microphone 310 of the mobile device 3, using the delay value T(d) of the mobile device 3 stored in the memory. As given by Equation (2) below, by cancelling the synchronized noise signal Noise (Ds) from the user's voice signal Voice(d), the pre-processed voice signal Vcmd, i.e., the noise-cancelled voice signal Vcmd, may be obtained.

$$Vcmd = Voice(d) - Noise(Ds) \qquad (2)$$

Figure 14:
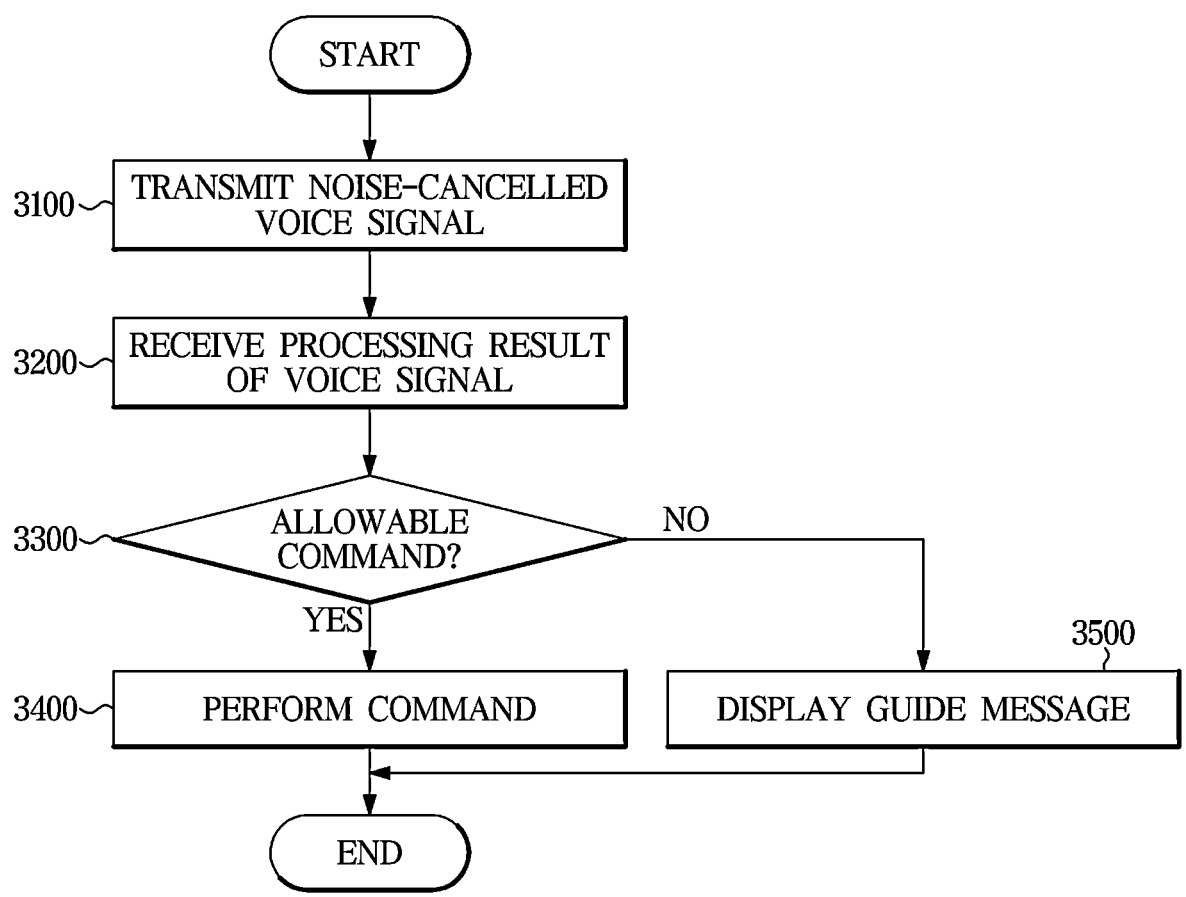
FIG. 14 is a flowchart illustrating operations of processing a speech command differently depending on an object to which the speech command is input, in a control method of a vehicle according to an embodiment.
Figure 15:
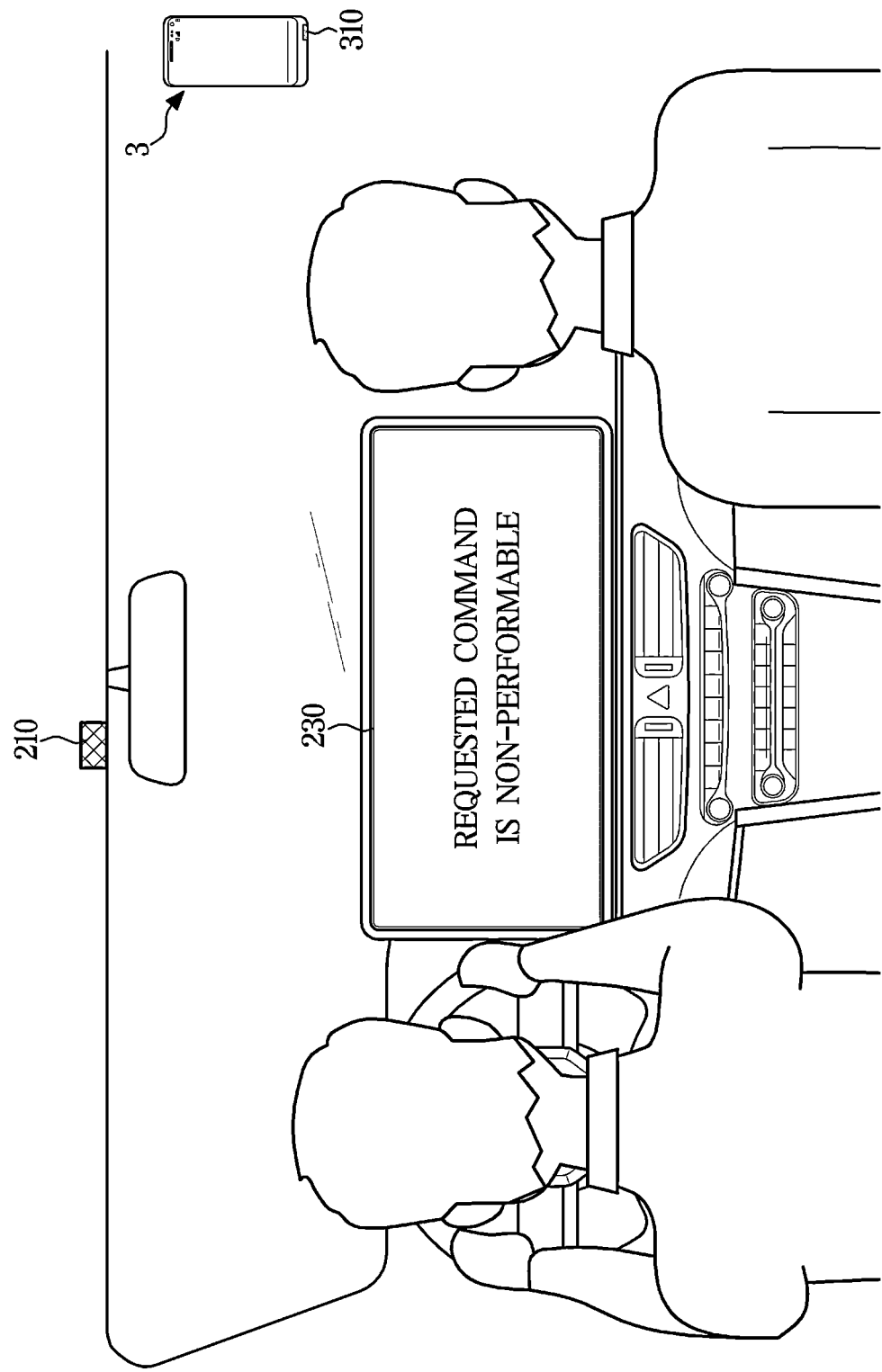
FIG. 15 is a diagram illustrating an example of a guide signal output when a speech command is not performable, in a vehicle according to an embodiment.

FIG. 14 is a flowchart illustrating operations of processing a speech command differently depending on an object to which the speech command is input, in a control method of a vehicle according to an embodiment. FIG. 15 is a diagram illustrating an example of a guide signal output when a speech command is not performable, in a vehicle according to an embodiment.

Referring to FIG. 14, when a voice signal where noise is cancelled according to the above-described operations is transmitted to the speech recognition system 100 (3100), the speech recognition module 110 and the natural language understanding module 120 of the speech recognition system 100 may determine an intent corresponding to the transmitted voice signal.

The speech recognition system 100 transmits a processing result of the voice signal to the vehicle 2. The transmitted processing result of the voice signal may include the intent corresponding to the voice signal and/or a control signal for performing a command indicated by the corresponding intent.

The communication module 240 of the vehicle 2 receives the processing result of the voice signal from the speech recognition system 100 (3200).

The controller 250 of the vehicle 2 determines whether the command corresponding to the voice signal is allowable, based on whether the voice signal is output from the microphone 310 of the mobile device 3 or the microphone 210 of the vehicle 2 (3300).

The control method of the vehicle according to an embodiment may limit types of commands that may be input through the mobile device 3, which is based on an assumption that the command input through the mobile device 3 is made by an occupant, not a driver. For safety, only a driver is allowed to input a command for vehicle control, and an occupant is also allowed to input a command for other controls except for the vehicle control.

The types of commands allowable according to a subject providing the voice signal may be stored in the memory.

For example, a command that may be input through the microphone 210 of the vehicle 2 may include: a vehicle control; multimedia control; phone/text message; navigation; and the like. A command that may be input through the microphone 30 of the mobile device 3 may include multimedia control, phone/text message, and the like, except for the vehicle control, and include or exclude navigation according to settings.

Alternatively, a driving-related control among the vehicle control may be input only through the microphone 210 of the vehicle 2, and an air conditioning control, seat control of a passenger seat, lighting control, and the like, which are irrelevant to driving, may be input through the microphone 310 of the mobile device 3 as well.

Whether to allow a command according to a subject providing a voice signal may be determined in units of domains or in units of individual commands.

As a result of determination, when the command corresponding to the voice signal is an allowable command (Yes in operation 3300), the controller 250 performs the command (3400). When the command corresponding to the voice signal is not allowable (No in operation 3300), the controller 250 may generate and display a guide message indicating that the requested command is not performable (3500), as shown in FIG. 15. The guide message may be visually output through the display 230, or audibly output through the speaker 220.

According to the above embodiments, an occupant as well as a driver may conveniently use a speech recognition system without adding an additional microphone, and noise cancellation may be effectively performed, thereby improving a speech recognition rate.

As is apparent from the above, according to embodiments of the disclosure, the vehicle and the control method thereof can allow an occupant as well as a driver to conveniently use a speech recognition system by utilizing a microphone of a mobile device as a source of speech input.

Also, when a driver uses a speech recognition system, a microphone of a mobile device can be utilized as a source of noise collection, thereby reducing the number of microphones in a vehicle and costs.

Although embodiments have been described for illustrative purposes, those having ordinary skill in the art should appreciate that various modifications, additions and substitutions are possible, without departing from the scope and spirit of the disclosure. Therefore, embodiments have not been described for limiting purposes.

What is claimed is:

1. A vehicle, comprising:
a microphone provided inside the vehicle;
a speaker provided inside the vehicle;
a communication module configured to communicate with a mobile device located inside the vehicle; and
a controller,
wherein, in a first mode in which a voice signal of a user is received from the mobile device:
the communication module is configured to receive the voice signal of the user from the mobile device, and
the controller is configured to perform noise cancellation on the user's voice signal received from the mobile device, based on an audio signal input to the microphone,
wherein, in a second mode in which the voice signal of the user is received from the microphone:
the communication module is configured to receive an audio signal from the mobile device, and
the controller is configured to perform noise cancellation on the voice signal of the user input to the microphone, based on the audio signal received from the mobile device,
wherein the controller is configured to generate a control signal configured to perform a command corresponding to the voice signal of the user, and
wherein types of commands corresponding to the user's voice signal received from the mobile device in the first mode are allowed more restrictively than the types of commands corresponding to the user's voice signal received by the microphone in the second mode.

2. The vehicle of claim 1, wherein the controller is configured to control the speaker to output a test sound in a registration mode configured to register the mobile device.

3. The vehicle of claim 2, wherein, in the registration mode, the controller is configured to calculate a delay of the mobile device based on a test sound signal and map, wherein the test sound signal is received from the mobile device after controlling the speaker to output the test sound, and the controller is configured to store the calculated delay to the mobile device.

4. The vehicle of claim 3, wherein, in the first mode, the controller is configured to synchronize the audio signal input to the microphone and the user's voice signal received from the mobile device, based on the delay mapped to the mobile device.

5. The vehicle of claim 3, wherein, in the second mode, the controller is configured to synchronize the user's voice signal input to the microphone and the audio signal received from the mobile device, based on the delay mapped to the mobile device.

6. The vehicle of claim 1, wherein when a speech recognition trigger signal is input to the mobile device, the controller is configured to operate in the first mode, and when the speech recognition trigger signal is input to the vehicle, the controller is configured to operate in the second mode.

7. The vehicle of claim 1, wherein the communication module is configured to receive a voice signal of an occupant of the vehicle from the mobile device in the first mode, and the microphone is configured to receive a speech of a driver of the vehicle in the second mode.

8. The vehicle of claim 1, wherein the communication module is configured to transmit the user's voice signal where the noise cancellation is performed to a speech recognition system.

9. The vehicle of claim 1, wherein, when the command corresponding to the user's voice signal received from the mobile device is allowable, the controller is configured to generate the control signal configured to perform the command, and wherein when the command corresponding to the user's voice signal received from the mobile device is not allowable, the controller is configured to generate a guide message.

10. A control method of a vehicle, the control method comprising:
  determining a first mode or a second mode related to a speech recognition, the first mode configured to receive a voice signal of a user from a mobile device located inside the vehicle and the second mode configured to receive the voice signal of the user from a microphone provided in the vehicle;
  when the first mode is in operation, receiving the voice signal of the user from the mobile device;
  when the first mode is in operation, performing noise cancellation on the user's voice signal received from the mobile device, based on an audio signal input to the microphone;
  when the second mode is in operation, receiving an audio signal from the mobile device;
  when the second mode is in operation, performing noise cancellation on the voice signal of the user input to the microphone, based on the audio signal received from the mobile device; and
  generating a control signal configured to perform a command corresponding to the voice signal of the user,
  wherein types of commands corresponding to the user's voice signal received from the mobile device in the first mode are allowed more restrictively than the types of commands corresponding to the user's voice signal received by the microphone in the second mode.

11. The control method of claim 10, further comprising registering the mobile device in the vehicle.

12. The control method of claim 11, wherein registering the mobile device in the vehicle comprises controlling a speaker, provided in the vehicle, to output a test sound.

13. The control method of claim 12, wherein registering the mobile device in the vehicle further comprises:
  calculating a delay of the mobile device based on a test sound signal, received from the mobile device after controlling the speaker to output the test sound; and
  mapping and storing the calculated delay to the mobile device.

14. The control method of claim 13, wherein performing noise cancellation comprises: when the first mode is in operation, synchronizing the audio signal input to the microphone and the user's voice signal received from the mobile device, based on the delay mapped to the mobile device.

15. The control method of claim 13, wherein performing noise cancellation comprises: when the second mode is in operation, synchronizing the user's voice signal input to the microphone and the audio signal received from the mobile device, based on the delay mapped to the mobile device.

16. The control method of claim 10, wherein determining the first mode or the second mode related to the speech recognition comprises: determining as the first mode when a speech recognition trigger signal is input to the mobile device, and determining as the second mode when the speech recognition trigger signal is input to the vehicle.

17. The control method of claim 10, wherein, when the first mode is in operation, the user's voice signal received from the mobile device includes a voice signal of an occupant of the vehicle, and when the second mode is in operation, the user's voice signal input to the microphone includes a voice signal of a driver of the vehicle.

18. The control method of claim 10, further comprising:
  when the command corresponding to the user's voice signal received from the mobile device is allowable, generating the control signal configured to perform the command; and
  when the command corresponding to the user's voice signal received from the mobile device is not allowable, generating a guide message.

* * * * *